(12) United States Patent
Bastin et al.

(10) Patent No.: US 7,325,758 B2
(45) Date of Patent: Feb. 5, 2008

(54) METHOD OF UPGRADING COMPOSITE MATERIALS

(75) Inventors: Pierre Bastin, Bastogne (BE); Jean-Yves Simon, Chiny (BE)

(73) Assignee: Tarkett SAS (FR)

( * ) Notice: Subject to any disclaimer, the term of this patent is extended or adjusted under 35 U.S.C. 154(b) by 134 days.

(21) Appl. No.: 10/536,304

(22) PCT Filed: Nov. 24, 2003

(86) PCT No.: PCT/EP03/50888

§ 371 (c)(1), (2), (4) Date: May 25, 2005

(87) PCT Pub. No.: WO2004/048059

PCT Pub. Date: Jun. 10, 2004

(65) Prior Publication Data

US 2006/0163394 A1    Jul. 27, 2006

(30) Foreign Application Priority Data

Nov. 26, 2002  (EP) .................................. 02292926

(51) Int. Cl.
*B02C 11/08*    (2006.01)
(52) U.S. Cl. ...................................... 241/23; 241/24.19
(58) Field of Classification Search ................ 241/23, 241/24.19, 14
See application file for complete search history.

(56) References Cited

U.S. PATENT DOCUMENTS

| 2,879,005 A | * | 3/1959 | Jarvis ............................ 241/14 |
| 5,611,493 A | | 3/1997 | Hayashi et al. |
| 5,735,471 A | | 4/1998 | Muro |

FOREIGN PATENT DOCUMENTS

| EP | 0 068 82 502 | 5/1983 |
| WO | WO 97/07893 | 6/1997 |

OTHER PUBLICATIONS

International Search Report; PCT/EP03/50888; Jun. 9, 2004.
G.R. Daborn and R. Derry; Special Report; "Cryogenic Communication in Scrap Recycling"; XP-002057687; Warren Spring Laboratory, Department of Trade and Industry, Stevenage, Herts SG1 2BX (UK); 1998 Elsevier Science Publishers B.V./Pergamon Press plc.

* cited by examiner

*Primary Examiner*—Faye Francis
(74) *Attorney, Agent, or Firm*—Cantor Colburn LLP

(57) ABSTRACT

The invention relates to a method of upgrading a composite material containing fibrous matter and non-fibrous plastic matter. The inventive method includes the following steps consisting in: cooling the composite material to a temperature of between −40° C. and +10° C., grinding the cooled composite material in order to disconnect the fibrous matter from the non-fibrous plastic matter; and separating the fibrous matter from the non-fibrous plastic matter.

11 Claims, No Drawings

METHOD OF UPGRADING COMPOSITE MATERIALS

TECHNICAL FIELD OF THE INVENTION

The present invention relates to a valorisation method for a composite material comprising fibrous materials and non-fibrous materials.

BRIEF SUMMARY OF RELATED ART

The use of composite materials comprising fibrous materials and non-fibrous plastic materials is very wide.

Such composite materials associating fibrous materials with non-fibrous plastic materials are currently used in claddings for floors or walls. These composite materials may also be used as thermal or sound insulators, for example in the field of the building or automobile industry. For these applications, a felt is associated with a non-fibrous compact and/or expansed plastic layer. In other cases, the fibrous material is not found as a web but as a lattice associated with other layers.

For example, textile webs based on polyester, polyamide, and/or polypropylene, as a homo- or co-polymer, or further non-woven products based on polyamide, polyester or polypropylene, as a homo- or co-polymer, are included among the fibrous materials. As for non-fibrous plastic materials, they are often based on PVC, styrenic polymers (SBS), polyolefins, etc.

In certain cases, the non-fibrous plastic layer may be sandwiched between two layers of fibrous material, for example between a textile web or a non-woven fabric.

Besides the textile/carpet well-known decorative aspect, for example the fibrous materials may also be selected for:
  their mechanical strength—increasing stiffness for example,
  heat resistance,
  their capability of imparting to the composite better dimensional stability . . .

With the development of these composite materials, the recycling problem is posed, either as production scrap, or by recuperating the end-of-life products after their use.

The recycling of these composite materials generally causes problems for the following reasons:
  fibrous materials generally have much higher melting points than those of non-fibrous materials. For example, polyamide and polyester fibrous have a melting point in the vicinity of 250° C. whereas polyethylenes already melt around 120° C.
  fibrous materials generally are much stiffer than non-fibrous materials.

Assemblies of fibrous and non-fibrous materials, for example multilayer materials, are therefore difficult to recycle. Indeed, fibrous materials poorly disperse in re-melted non-fibrous materials. The melting temperatures for fibrous materials are often 100° C. higher than those of the associated non-fibrous materials. It is very often illusory to mix all the materials beyond the melting point of the fibrous materials, because of the thermal degradation problems that this would cause to the non-fibrous materials. Very low mechanical properties of the recycled materials result from this. In addition, the unmelted fibrous materials rapidly clog up the filters of the recycling facilities. Separation of the fibrous and non-fibrous materials is therefore essential for proper valorisation of these types of materials.

EP-A-0 750 944, describes a device for milling materials in which the materials are cooled to a temperature less than the glass transition temperature of the material before being milled. With the device, it is thereby possible to entirely mill the material into fine particles. During milling, the whole of the materials is milled into particles of more or less the same size. Therefore, such a device does not allow subsequent separation of the milled materials. Further, the material should be cooled at a very low temperature, which is generally of the order of −100° C. Cooling the material to such a low temperature causes high costs.

OBJECT OF THE INVENTION

The invention purposes both an efficient and economical valorisation method for a composite material.

DETAILED DESCRIPTION OF THE INVENTION

According to the invention, the present invention proposes a valorisation method for a composite material comprising fibrous materials and non-fibrous plastic materials, the method comprising the steps of cooling the composite material to a temperature between −40° C. and +10° C.; milling the cooled composite material in order to dissociate the fibrous materials from the non-fibrous plastic material and separating the fibrous materials from the non-fibrous plastic materials. The fibrous materials and the non-fibrous plastic materials may be recuperated separately and recycled.

Indeed, during milling at these temperatures, the fibers are hardly broken and remain long whereas the non-fibrous plastic materials are milled and form particles with a more or less uniform size. The fact that at these temperatures, one manages to mill non-fibrous plastic materials without however breaking the fibers is surprising. It should be expected that the fibers also break considering that the material composing them is stiff at the temperatures used. Now, this is not the case. The non-fibrous material dissociates from the fibrous material and a separation of both materials is facilitated.

The method according to the invention has another particularly surprising effect from the point of view of the milling temperature. Indeed, according to the state of the art, the composite material should be cooled to a lower temperature than the glass transition temperature of the composite material. Knowing that the glass transition for polyolefins is around −80° C., a composite material comprising polyolefins should therefore be cooled to a temperature less than −80° C. before milling. Now, the milling of such composite materials may easily be performed at temperatures of about −40° C.; i.e., at a temperature significantly higher than the glass transition for polyolefins. Of course, this is an economical advantage as the consumption of coolant for example liquid nitrogen or dry ice, remains moderate.

The method according to the invention allows the fibers to be almost totally dissociated and separated subsequently, as compared with the non-fibrous plastic materials and the composite materials to be therefore recycled efficiently. Moreover, thanks to moderately low milling temperatures, the costs associated with cooling remain low, which is economically advantageous.

According to a first advantageous embodiment, the composite material is cooled to a temperature between −30° C. and −10° C.

The non-fibrous plastic material may comprise PVC, styrenic polymers such as SBS or polyolefins. Even if the non-fibrous plastic material is lubricated and/or plasticized and/or loaded, the milling capability or capacity at these temperatures of the non-fibrous plastic material is excellent.

The fibrous material may be a felt associated with a non-fibrous plastic compact and/or expanded layer.

The fibrous material may be a textile web for example made according to the tuft or needle-bonding method or a non-woven fabric.

The fibrous material may be a plastic material comprising polyesters and/or polyamides and/or polyolefins as homo- or co-polymers, glass fibers, polyaramide fibers, etc.

After milling the composite material, the fibrous materials may be mechanically separated from the non-fibrous plastic materials for example by means of a sieve or a centrifuge.

EXAMPLES OF APPLICATION

Example 1

Separation of a Composite Comprising One or More Non-fibrous Plastic Sublayers and a Non-woven Fabric A) Fibrous Portion In such a case, the fibers are formed by a non-woven fabric based on polyester fibers and/or polyester-polyamide co-extruded fibers.

B) Non-fibrous Portion

The sublayer is based on a compound which comprises inter alia plasticized, loaded, lubricated PVC or loaded, lubricated polyolefins with additives, comprising plasticizing oils (process oils).

Of course, a compound based on other plastic materials (for example, SBS or SBR) would also be usable.

C) Examples of Compositions

The mineral fillers are for example chalk, calcite, barita, dolomite, silica, kaolin. The plasticizers (case of PVC) are those well-known from PVC (phthalates for example).

The plasticizing oils are mineral oils derived from oil refining, with a more or less aromatic or naphtenic or paraffinic character.

The lubricants and additives are those generally proposed by the art and the commercial ones.

C1) PVC Sublayer Examples

| PVC: | 2.5% |
|---|---|
| DINP: | 17% |
| Chalk: | 29% |
| Baryta: | 24% |
| Stabilizer/lubricant: | 1.5% |
| Various additives: | 1% |

C2) Polyolefin Sublayer Examples

PEBD (low density polyethylene)/LLDPE (linear low density polyethylene)/VLDPE (very low density linear polyethylene)/EVA (ethylene-vinylacetate copolymer)/EPDM (ethylene propylene diene copolymer) or POE (elastomeric polyolefins, whether metallocene or not) or POP (polyolefin plastomers whether metallocene or not): 16%

| Mineral oil: | 6% |
|---|---|
| Chalk: | 25% |

-continued

| Baryta: | 52% |
|---|---|
| Additives: | 1% |

It is obvious that the compositions may change in relatively significant proportions according to the final requirements requested for the sublayer. Of course, the reasoning applies for alternatives based on polypropylene (whether copolymers or not) and HDPE (high density polyethylene) as well as MDPE (medium density polyethylene).

C3) Distributions of the Layers

Non-woven fabric: varies from 15 to 70 $g/m^2$ (or even more)

Sublayer: typically varies from 1 to 7 $kg/m^2$

D) Pre-milling of the Composites

The composites are crudely milled at room temperature without attempting to separate the fibers. The milling dimensions are of the order of the cm on the side.

E) Cooling of the Granules

The granules are transported in a cylinder by means of an Archimedes screw. Liquid nitrogen counter-flowing in the screw cools the granules. When the granules are at a temperature between −40 and −10° C., the granules fall into the mill. This temperature may vary according to the flexibility and ductility of the plastic sublayer.

F) Separation of the Fibers and of the Plastic Powders

As seen, the fibers are practically not cut during the milling operation, whereas the non-fibrous plastic materials are reduced to the state of powders.

By sedimentation, by means of a sieve or by blowing, the physical separation of the fibers and powders is very easy.

G) Reuse of the Recuperated Powders

80% and often even more than 90% of the non-fibrous material may be recuperated as powders easily.

Conversely, the amounts of finely cut fibers, capable of passing through the sieves are very small. It may be estimated that this proportion is significantly less than 10% of the initial amounts of the fibers.

The low rate of very fine fibers passing through the sieves is not really a nuisance as these fibers behave like mineral filler.

The recuperated powders may be re-introduced into the sublayer structure in amounts exceeding 50% by weight without degrading the conditions for applying this sublayer (absence of any clogging of the extrusion filters for example) as well as those linked to a subsequent thermoforming process (for example).

Example 2

Separation of a Composite Based on a Plastic Material and a Felt

Also, very positive separation results after milling at a relatively low temperature (−30 to −10° C. indicatively) were obtained with plastic-felt composites.

The felts for example consist of reclaimed textile waste.

Contrary to non-woven fabrics, which may also be of small thickness, the felts may have a thickness of several mm (even often several cm). These felts may be bonded by a thermosetting resin of the phenol-formaldehyde type for example, or a thermoplastic resin. Depending on the compression state, flexible felts (light compression) or stiff felts (high compression) may be obtained. These felts are used for sound damping materials or parts of stiff structures (for example rear window shelves for the automobile sector).

The separation yields are comparable to those mentioned in example 1.

Example 3

Separation of a Plastic Based Composite and a Tufted or Needled Textile Material Also very positive results for facilitating separation after milling at a relatively low temperature (−30 to −10° C. indicatively) were obtained with composites based on a plastic and a tufted or needled textile material.

The non-fibrous portions have the same compositions as in example 1.

The textiles comprise polyamide fibers, polyester fibers or a mixture of both of these fibers with optionally a certain percentage of polyethylene fibers and/or polypropylene fibers.

These fibers are generally bonded at their base by SBR type latex and/or by a coating of polyethylene powders.

The separation yields are in accordance with those mentioned in Example 1.

Example 4

Separation of a Plastic and Glass Fiber Based Composite

The sublayer (stamped by the glass veil) is of the polyolefin or PVC type (following examples C1 and C2).

It is seen that milling at the indicated temperatures (−30 to −10° C. for example), depending on the ductility of the plastic formulation, generates production of granules while avoiding excessive powdering of the glass veil. Production of large quantities of small glass particles with very small dimensions is thereby avoided.

Therefore, milling of plastic-glass veil composites following the described method strongly reduces the health drawbacks related to the presence of glass particles of very small dimensions.

Remarks on Liquid Nitrogen Consumption

It is approximately estimated to be 0.5 kg of liquid nitrogen/kg of composite to be separated, which proves that the material is not cooled to very low temperatures.

Conventional cryogenic milling involves much higher liquid nitrogen consumption. Besides the much higher costs of such a conventional cryogenic milling, these methods are less performing as for the separation of fibers and non-fibrous plastic materials.

Remarks on Recuperation of the Fibers

According to their purity level, their separate re-extrusion may be contemplated in order to make stiff parts out of them, such as the parts of structures or wheel housings for the automobile sector.

If the fibers are mixtures of polyester, polyamide, and/or polypropylene, it is sufficient to put a few percent of an agent which "compatibilizes" different types of fibers in order to obtain good characteristics of the recycled fibers.

The invention claimed is:

1. A valorization method for a composite material comprising fibrous materials and non-fibrous plastic materials, said method comprising:

cooling said composite material to a temperature between −40° C. and +10° C.;

milling said cooled composite material in order to dissociate said fibrous materials from the non-fibrous plastic materials said milling occurring at said temperature higher than the glass transition temperature of said composite material; and separating said fibrous materials from said non-fibrous plastic materials, said separating occurring at said temperature higher than the glass transition temperature of said composite material.

2. The method according to claim 1, wherein said composite material is cooled to a temperature between −30° C. and −10° C.

3. The method according to claim 1, wherein said non-fibrous plastic material comprises a material chosen from the group including PVC, styrenic polymers such as SBS or polyolefins.

4. The method according to claim 1, wherein said non-fibrous plastic material is lubricated, plasticized or loaded, or a combination thereof.

5. The method according to claim 1, wherein said fibrous material comprises a felt.

6. The method according to claim 5, wherein said fibrous material comprises materials chosen from the group consisting of polyesters, polyamides, polyolefins, as homo- or co-polymers, glass fibers and polyaramide fibers.

7. The method according to claim 1, wherein said fibrous material comprises a textile web.

8. The method according to claim 7, wherein said fibrous material comprises materials chosen from the group consisting of polyesters, polyamides, polyolefins, as homo- or co-polymers, glass fibers and polyaramide fibers.

9. The method according to claim 1, wherein said fibrous material comprises a non-woven fabric.

10. The method according to claim 9, wherein said fibrous material comprises materials chosen from the group consisting of polyesters, polyamides, polyolefins, as homo- or co-polymers, glass fibers and polyaramide fibers.

11. The method according to claim 1, wherein said fibrous materials are mechanically separated from said non-fibrous plastic materials.

* * * * *